(12) United States Patent
Wrathall

(10) Patent No.: US 8,018,744 B1
(45) Date of Patent: *Sep. 13, 2011

(54) POWER FACTOR CORRECTION BY MEASUREMENT AND REMOVAL OF OVERTONES

(75) Inventor: Robert S. Wrathall, Scotts Valley, CA (US)

(73) Assignee: Robert Wrathall, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,843

(22) Filed: May 13, 2010

Related U.S. Application Data

(62) Division of application No. 11/784,423, filed on Apr. 6, 2007, now Pat. No. 7,719,862.

(51) Int. Cl.
*H02M 1/12* (2006.01)
*G01R 23/20* (2006.01)
*H03K 5/08* (2006.01)

(52) U.S. Cl. ............ 363/45; 324/623; 327/330

(58) Field of Classification Search .......... 323/207, 323/222, 282–285, 299, 301; 324/623; 327/329, 327/330
See application file for complete search history.

(56) References Cited

U.S. PATENT DOCUMENTS

| | | | |
|---|---|---|---|
| 3,824,446 A | 7/1974 | Forster et al. | |
| 4,774,454 A * | 9/1988 | Yamaguchi et al. | .......... 324/623 |
| 5,557,560 A | 9/1996 | Dix et al. | |
| 5,561,595 A | 10/1996 | Smith | |
| 5,751,138 A | 5/1998 | Venkata et al. | |
| 6,344,986 B1 * | 2/2002 | Jain et al. | .......... 363/89 |
| 6,465,990 B2 * | 10/2002 | Acatrinei et al. | .......... 323/222 |
| 6,608,770 B2 | 8/2003 | Vinciarelli et al. | |
| 6,657,417 B1 | 12/2003 | Hwang | |
| 7,057,907 B2 | 6/2006 | Oh | |
| 7,084,369 B2 | 8/2006 | Sosnowski | |
| 7,148,664 B2 | 12/2006 | Takahashi et al. | |
| 7,274,579 B2 | 9/2007 | Ueda et al. | |
| 2005/0212501 A1 | 9/2005 | Acatrinei | |
| 2005/0270814 A1 * | 12/2005 | Oh | .......... 363/98 |
| 2007/0236963 A1 * | 10/2007 | Yasumura | .......... 363/16 |

OTHER PUBLICATIONS

Erickson et al. "Fundamentals of Power Electronics." 2nd ed., Springer Science + Business Media, 2001. pages 143-145.
"Power Factor Correction Handbook." HBD853/D, Rev. 2, on Semiconductor, Aug. 2004, pp. 5-17, 73-79, and 91-95.

* cited by examiner

*Primary Examiner* — Adolf Berhane
*Assistant Examiner* — Emily Pham
(74) *Attorney, Agent, or Firm* — Carr & Ferrell LLP

(57) ABSTRACT

A power factor correction circuit (42/44) responsive to an input power supply signal at an input supply voltage ($V_{AC}$) that varies largely sinusoidally with time at a fundamental supply frequency contains regulator/control circuitry (60, 62, and 64) for measuring and removing overtones ($I_{LDm}$ or $I_{FWRm}$) in the input supply current ($I_{LD}$) or in a rectified form ($I_{FWR}$) of the input supply current. Each overtone is expressible as the product of an amplitude component ($I_m$) and a sinusoidal function ($I_m \sin[(m+1)\omega_{AC}t]$) that varies with time at an integer multiple of the fundamental supply frequency. The regulator/control circuitry measures an overtone by determining the overtone's amplitude component. After generating an adjustment factor ($S_{ADJ}$) largely as the product of that overtone's amplitude component and an associated sinusoidal function, the regulator/control circuitry adjusts the input supply current or its rectified form by an amount corresponding to the adjustment factor for each measured overtone.

20 Claims, 9 Drawing Sheets

POWER FACTOR CORRECTION BY MEASUREMENT AND REMOVAL OF OVERTONES

CROSS-REFERENCE TO RELATED APPLICATION

This is a division of U.S. patent application Ser. No. 11/784,423, filed 6 Apr. 2007, now U.S. Pat. No. 7,719,862 B2.

FIELD OF USE

This relates to power factor correction.

BACKGROUND

Power companies furnish alternating-current ("AC") power in the form of supply voltages that vary largely sinusoidally with time. Referring to FIG. 1, it illustrates a simplified version of a power-supply circuit in which AC power supply 20, such as that of a power company, provides analog input AC supply voltage $V_{AC}$ at fundamental power supply frequency $f_{AC}$ to load 22 at a consumer's location. AC supply voltage $f_{AC}$ is specifically given as:

$$V_{AC} = V_0 \sin(\omega_{AC} t) \qquad (1)$$

where $V_0$ is a voltage amplitude component, $\omega_{AC}$ is the fundamental angular supply frequency equal to $2\pi f_{AC}$, and t is time. Load current $I_{LD}$ flows through load 22, causing it to consume instantaneous power $P_I$ equal to $I_{LD} V_{AC}$.

The time variation of load current $I_{LD}$ depends on the constituency of load 22. Resistors, inductors, and capacitors, all of which are linear electronic elements in their ideals forms, may be variously present in load 22. Waveforms for supply voltage $V_{AC}$, load current $I_{LD}$, and instantaneous power $P_I$ for a full $V_{AC}$ cycle are presented in FIGS. 2a-2c for three different linear implementations of load 22.

Load current $I_{LD}$ ideally varies in a sinusoidal manner fully in phase with supply voltage $V_{AC}$. This situation when arises when load 22 is purely resistive as represented by the waveforms shown in FIG. 2a. The phase angle $\phi$ between the $I_{LD}$ and $V_{AC}$ waveforms is zero. Instantaneous power $P_I$ varies in a sinusoidal manner at twice supply frequency $f_{AC}$. When load 22 is purely resistive, it consumes all the power available from power supply 20. The average consumed power $P_{AV}$ is therefore the maximum possible.

If load 22 is purely inductive as represented by the waveforms depicted in FIG. 2b, phase angle $\phi$ is 90°. As a result, average consumed power $P_{AV}$ is zero. All of the power provided by power supply 20 is returned to it. The same arises when load 22 is purely capacitive except that phase angle $\phi$ is −90°.

When load 22 consists of a combination of resistive, inductive, and capacitive elements, consumed power $P_{AV}$ lies between zero and the maximum possible (except in the rare instances where the effects of capacitive and inductive elements identically cancel each other). Part of the power provided by power supply 20 is returned to it. This situation is illustrated by the waveforms shown in FIG. 2c for an implementation of load 22 as a resistive/inductive combination. Load current $I_{LD}$ is then generally given as:

$$I_{LD} = I_0 \sin(\omega_{AC} t + \phi) \qquad (2)$$

where $I_0$ is a current amplitude component, and phase angle $\phi$ is between −90° and 90°.

The efficiency of power consumption is characterized in term of power factors. The power factor $PF_{Phase}$ for a phase-shifted implementation of load 22 as a linear combination of resistive, inductive, and capacitive elements is given as:

$$PF_{Phase} = \frac{\int_0^{t_F} I_0 \sin(\omega_{AC} t + \varphi) V_0 \sin(\omega_{AC} t) \, dt}{I_{LDRMS} V_{LDRMS} t_F} \qquad (3)$$

where $I_{LDRMS}$ is the root-mean-square ("RMS") value of load current $I_{LD}$, $V_{ACRMS}$ is the RMS value of supply voltage $V_{AC}$, and $t_F$ is the period of time, at least one cycle, over which power factor $PF_{Phase}$ is determined. Phase-shifted power factor $PF_{Phase}$ is one, the maximum possible, when phase angle $\phi$ is 0°, and zero when phase angle $\phi$ is ±90°. It is generally desirable that load 22 be configured to make power factor $PF_{Phase}$ as close to one as possible.

Load 22 may also include non-linear elements which cause load current $I_{LD}$ to have overtones of fundamental supply frequency $f_{AC}$. Each overtone frequency $f_m$ is given as:

$$f_m = m f_{AC} \qquad (4)$$

where m, a positive integer, is the overtone number. With the fundamental frequency constituent $I_{LD0}$ in load current $I_{LD}$ being given as:

$$I_{LD0} = I_0 \sin(\omega_{AC} t) \qquad (5)$$

each overtone frequency constituent $I_{LDm}$ in current $I_{LD}$ at zero phase angle is given as:

$$I_{LDm} = I_m \sin[(m+1)\omega_{AC} t] \qquad (6)$$

where $I_m$ is a positive current amplitude component for the mth overtone constituent $I_{LDm}$. For the overtone case, load current $I_{LD}$ is then given generally as:

$$I_{LD} = I_0 \sin(\omega_{AC} t) + \sum_{m=1}^{M} I_m \sin[(m+1)\omega_{AC} t] \qquad (7)$$

where M, the number of overtones, can theoretically go to infinity. More generally, Eq. 7 includes a summation of overtone cosine terms to accommodate phase angle $\phi$.

FIG. 3 illustrates a prior art example of $V_{AC}$ and $I_{LD}$ waveforms for a situation in which load 22 contains non-linear elements. FIG. 4 depicts the amplitude of each overtone current constituent $I_{LDm}$ relative to the amplitude of fundamental current constituent $I_{LD0}$ for this example. The relatives amplitudes of the odd-numbered overtones are small here due to the substantial $I_{LD}$ symmetry about the $V_{AC}$ peak values.

Part of the power in each overtone current constituent $I_{LDm}$ is returned to power supply 20. The power factor $PF_{Overtone}$ for a non-linear implementation of load 22 is given as:

$$PF_{Overtone} = \frac{P_{AV0}}{P_{AV0} + \sum_{m=1}^{M} P_{AVm}} \qquad (8)$$

where $P_{AV0}$ is the average power associated with fundamental frequency constituent $I_{LD0}$, and $P_{AVm}$ is the average power associated with each overtone frequency constituent $I_{LDm}$. As with phase-shifted power factor $PF_{Phase}$, it is generally desirable that load 22 be configured to make overtone power factor $PF_{Overtone}$ as close to one as possible. That is, load 22 is preferably configured to minimize the presence of overtones in load current $I_{LD}$.

Load 22 typically includes equipment which converts the AC power into direct-current ("DC") power for use by DC equipment. FIG. 5 depicts a conventional example in which load 22 consists of common-mode transformer 24, bridge rectifier 26, and DC load 28. Bridge rectifier 26, which is formed with four pn diodes DA, DB, DC, and DD, performs full-wave rectification on AC supply voltage $V_{AC}$ to produce analog full-wave rectified voltage $V_{FWR}$ provided to DC load 28. FIG. 6 illustrates how full-wave rectified voltage $V_{FWR}$ typically appears relative to supply voltage $V_{AC}$. Subject to the full-wave rectification, all of the preceding power considerations dealing with supply voltage $V_{AC}$ and load current $I_{LD}$ substantially apply to rectified voltage $V_{FWR}$ and the corresponding DC load current flowing through DC load 28.

Power factor correction circuitry is commonly incorporated into load 22 for the purpose of increasing power factors $PF_{Phase}$ and $PF_{Overtone}$. FIG. 7 illustrates a power-supply circuit containing switch-mode power factor correction circuitry as described in Acatrinei, U.S. Patent Publication 2005/0212501 A1. Load 22 in FIG. 7 consists of low-pass filter 30, bridge rectifier 26, constant pulse proportional current power factor correction inverter circuit ("CPPC PFC-IC") 32, constant pulse generator 34, and further DC load 36. Low-pass filter 30 is formed with common-mode transformer 24 and capacitors CA and CB. CPPC PFC-IC 32 consists of capacitor CC, inductor LA, diode DE, and power switching n-channel field-effect transistor QA.

Acatrinei's power factor correction circuitry operates as follows. Constant-pulse generator 34 operates at a fixed duty cycle to provide power transistor QA with switch voltage $V_{SW}$ as a sequence of pulses of fixed pulse width $t_W$ at fixed pulse frequency $f_P$ much greater than fundamental supply frequency $f_{AC}$. This causes transistor QA to alternately turn on and off many times during each $V_{FWR}$ wave. Switch current $I_{SW}$ flows through transistor QA in response to each $V_{SW}$ pulse and drops rapidly to zero when each pulse ends.

The voltage across an inductor is the product of its inductance and the time rate of change of the current through the inductor. The change $\Delta I_L$ in current $I_L$ through inductor LA is thereby approximately given by:

$$\Delta I_L = \left(\frac{V_L}{L_L}\right) t_w \quad (9)$$

where $V_L$ is the voltage across inductor LA, and $L_L$ is its inductance. Inductor current $I_L$ is the sum of switch current $I_{SW}$ and current $I_D$ through diode DE.

Total ground current $I_T$ substantially equals inductor current $I_L$ which, in turn, substantially equals the full-wave rectified version of load current $I_{LD}$. Letting $I_{DAV}$, $I_{SWAV}$, and $I_{TAV}$ be the respective average values of diode current $I_D$, switch current $I_{SW}$, and total current $I_T$ during a $V_{SW}$ pulse, the result of Eq. 8 is that instantaneous voltages $V_{AC}$ and $V_{FWR}$ and average currents $I_{DAV}$, $I_{SWAV}$, and $I_{TAV}$ for Acatrinei's power factor correction circuitry typically have the waveform shapes shown in FIG. 8a for a $V_{FWR}$ cycle. FIG. 8b illustrates how instantaneous currents $I_D$, $I_{SW}$, and $I_T$ change with switch voltage $V_{SW}$ during brief time portion 38 in FIG. 8a.

Inasmuch as total ground current $I_T$ substantially equals the full-wave rectified version of load current $I_{LD}$, average total ground current $I_{TAV}$ in Acatrinei's power factor correction circuitry should closely approach a sinusoidal shape during each $V_{FWR}$ cycle in order to make overtone power factor $PF_{Overtone}$ close to one. As indicated in FIG. 8a, average switch current $I_{SWAV}$ is of nearly sinusoidal shape. However, average total current $I_{TAV}$ is closer to a triangular shape than to a sinusoidal shape. Average total current $I_{TAV}$ thus includes a significant overtone constituency, causing power factor $PF_{Overtone}$ to be significantly below one.

It would be desirable to have switch-mode power factor correction circuitry in which the rectified overall load current is of nearly sinusoidal shape during each wave of the rectified AC supply voltage.

GENERAL DISCLOSURE OF THE INVENTION

The present invention provides such switch-mode power factor correction circuitry. In accordance with the invention, a power-factor correction circuit responds to an input power supply signal at an input supply voltage that varies largely sinusoidally with time at a fundamental supply frequency. The input supply signal is at an input supply current susceptible of having at least one overtone of the fundamental supply frequency. The present power factor correction circuit contains regulator/control circuitry for measuring at least one such overtone in the input supply current, or in a rectified form of the input supply current, and operating on the input supply current or on its rectified form to largely remove each measured overtone.

For a typical situation in which all non-negligible overtones are so removed from the rectified form of the input supply current, the rectified form of the input supply current substantially tracks the rectified form of the input supply voltage in time-varying waveform. That is, the rectified form of the input supply current is substantially proportional to the rectified form of the input supply voltage. Consequently, the input supply current is substantially proportional to the input supply voltage so that the overtone power factor is very close to one.

Each overtone in the input supply current or in its rectified form is normally expressible as the product of an amplitude component and a sinusoidal (sine or cosine) function that varies with time at an integer multiple of the fundamental supply frequency. The regulator/control circuitry measures an overtone in the input supply current or in its rectified form by determining that overtone's amplitude component. More particularly, the regulator/control circuitry generates an adjustment factor for an overtone in the input supply current or its rectified form at any time largely as the product of that overtone's amplitude component and an associated sinusoidal function at that time. The regulator/control circuitry then adjusts the input supply current or its rectified form by an amount corresponding to the adjustment factor for each measured overtone.

The power factor correction circuit of the invention preferably includes rectifier circuitry for performing full-wave rectification on the input supply signal to produce a full-wave rectified supply signal at a full-wave rectified voltage and a full-wave rectified current. A regulator in the regulator/control circuitry regulates the full-wave rectified voltage to produce a regulated power supply voltage with reduced voltage ripple. Control circuitry in the regulator/control circuitry measures at least one overtone in the full-wave rectified current and provides the regulator with a primary control signal that causes at least one overtone to be largely removed from the full-wave rectified current such that it largely tracks the full-wave rectified voltage in time-varying waveform.

In switch-mode applications, the regulator includes a switch and a current-sense conductor. The switch has first and second current-carrying electrodes and a control electrode for receiving the primary control signal to control current flow between the current-carrying electrodes. The current-sense conductor largely carries the full-wave rectified current and is coupled to the first current-carrying electrode through a current-sense node that provides a current-sense signal.

The control circuitry in switch-mode applications preferably contains a pulse generator and a pulse-width adjustor. The pulse generator generates the primary control signal as a sequence of pulses of controlled pulse widths for enabling current to flow through the current-carrying electrodes in response to the occurrence of each pulse and for substantially preventing current from flowing through the current-carrying electrodes in response to termination of each pulse. In response to the current-sense signal, the pulse-width adjustor measures at least one overtone in the full-wave rectified current and provides the pulse generator with an adjustment control signal that causes the pulse widths of the pulses of the primary control signal to be adjusted so as to largely remove at least one overtone from the full-wave rectified current.

By measuring and removing overtones in the preceding way, the overtone power factor can be made very close to one. Additionally, the phase angle between the full-wave rectified voltage and current is normally very close to zero in the power factor correction circuit of the invention, thereby enabling the phase-shifted power factor to be very close to one. This increases the flexibility in designing devices which operate from the regulated voltage provided by the present power factor correction circuit and in specifying the components of the operating devices. Sensitivity to variability in operating voltages and currents can be reduced significantly. Costs for manufacturing and testing the operating devices can likewise be reduced significantly. In short, the invention provides a substantial advance over the prior art.

BRIEF DESCRIPTION OF THE DRAWINGS

Like reference symbols are used in the drawings and in the description of the preferred embodiments to represent the same, or very similar, item or items.

DESCRIPTION OF THE PREFERRED EMBODIMENTS

Figure 9:
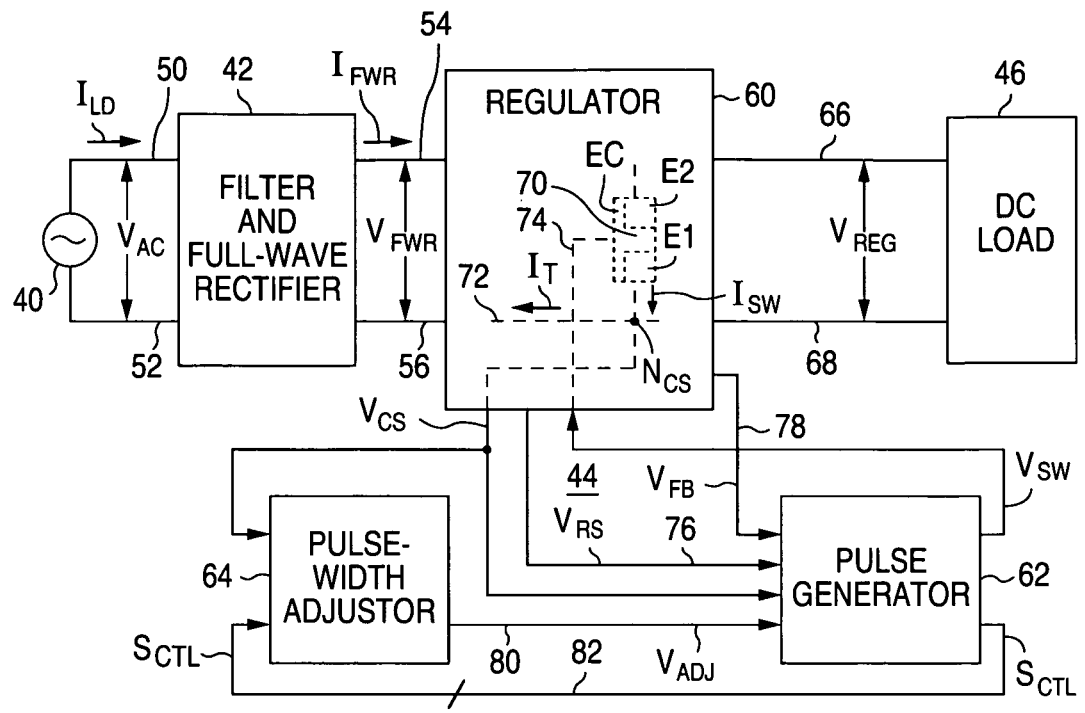
FIG. 9 is a block diagram of a power-supply circuit with full-wave rectification and power factor correction by measurement and removal of overtones according to the invention.

Referring to FIG. 9, it illustrates a power-supply circuit having which contains power factor correction circuitry configured in accordance with the invention for making overtone power factor $PF_{Overtone}$ and phase-shifted power factor $PF_{Phase}$ simultaneously very close to one. The power-supply circuit in FIG. 9 is formed with an AC power supply 40, a filter and full-wave rectifying circuit 42, regulator/control circuitry 44, and a DC load 46. AC power supply 40 is typically at the location of a power company. Components 42, 44, and 46 are typically at the location of a power consumer. The combination of filter and full-wave rectifier 42 and regulator/control circuitry 44 form a power factor correction circuit.

AC power supply 40 furnishes analog input AC supply voltage signal $V_{AC}$ at fundamental power supply frequency $f_{AC}$, typically 60 Hz. AC supply voltage $V_{AC}$, which varies substantially sinusoidally with time according to Eq. 1, is provided between a pair of main electrical lines 50 and 52 to filter and full-wave rectifier 42. The peak-to-peak variation in supply voltage $V_{AC}$ is typically 170 V. Supply voltage $V_{AC}$ causes an AC supply current to flow through main electrical lines 50 and 52. The AC supply current constitutes load current $I_{LD}$. Although only high supply line 50 is indicated as carrying load current $I_{LD}$ in FIG. 9, local ground line 52 also carries load current $I_{LD}$ because current travels in a closed loop.

Figure 1:
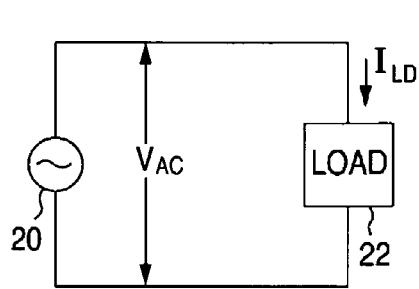
FIG. 1 is a circuit diagram of a conventional power-supply circuit.
Figure 2A:
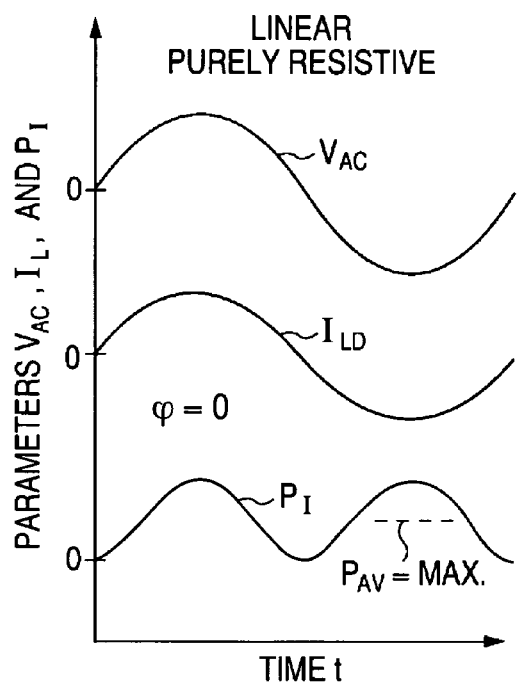
FIGS. 2a-2c are waveform diagrams for supply voltage, load current, and instantaneous power as a function of time for three respective linear implementations of the load in the power-supply circuit of FIG. 1.
Figure 2B:
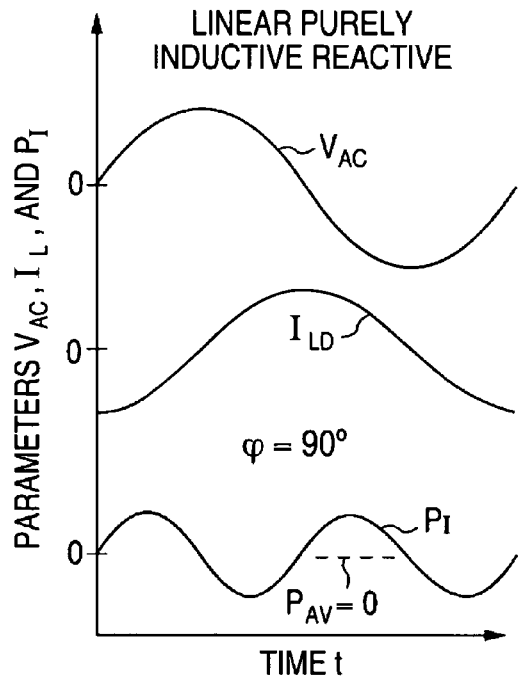
Figure 2C:
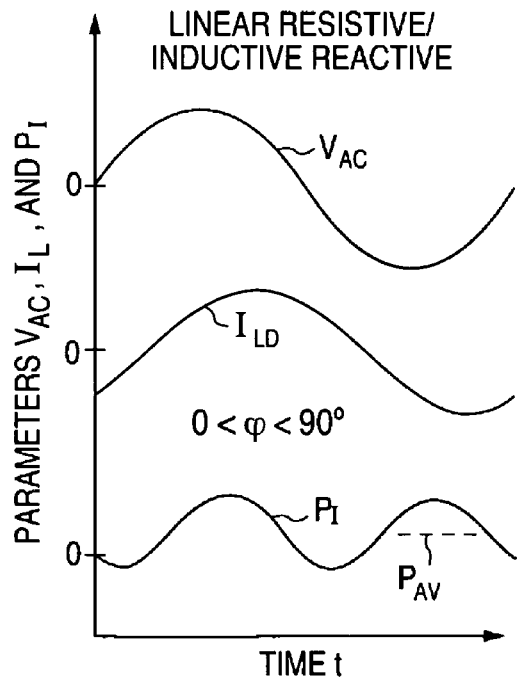
Figure 3:
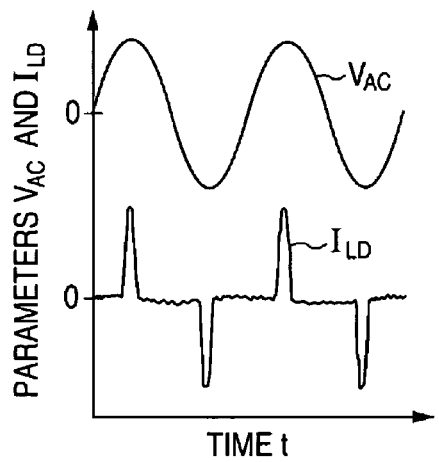
FIG. 3 is a waveform diagram for supply voltage and load current as a function of time for a non-linear implementation of the load in the power-supply circuit of FIG. 1.
Figure 4:
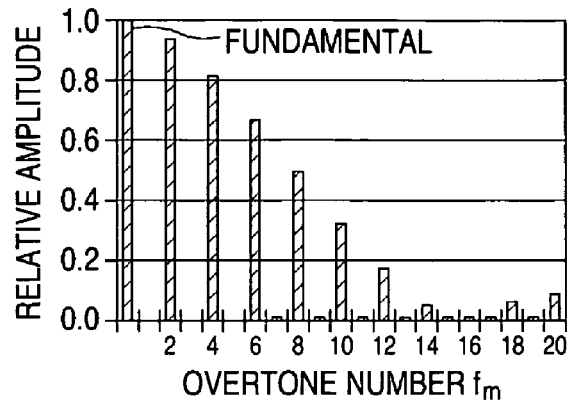
FIG. 4 is graph for the relative amplitudes of overtone constituents in the load current for the power-supply circuit of FIG. 1 as implemented with the non-linear load represented by the waveform diagram of FIG. 3.
Figure 5:
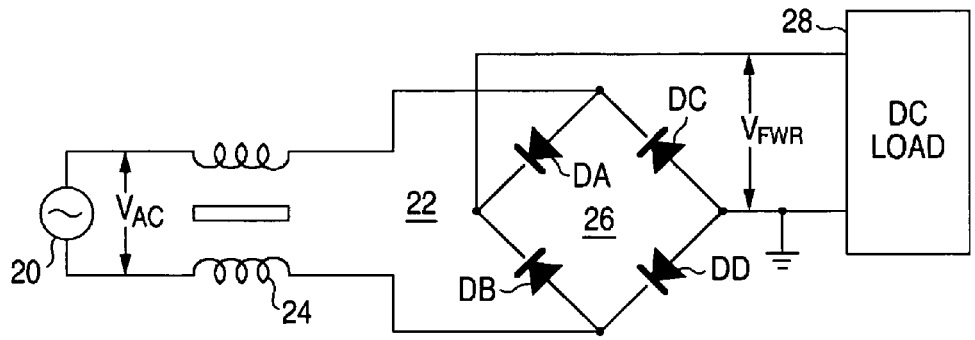
FIG. 5 is a circuit diagram of a conventional power-supply circuit with full-wave rectification.
Figure 7:
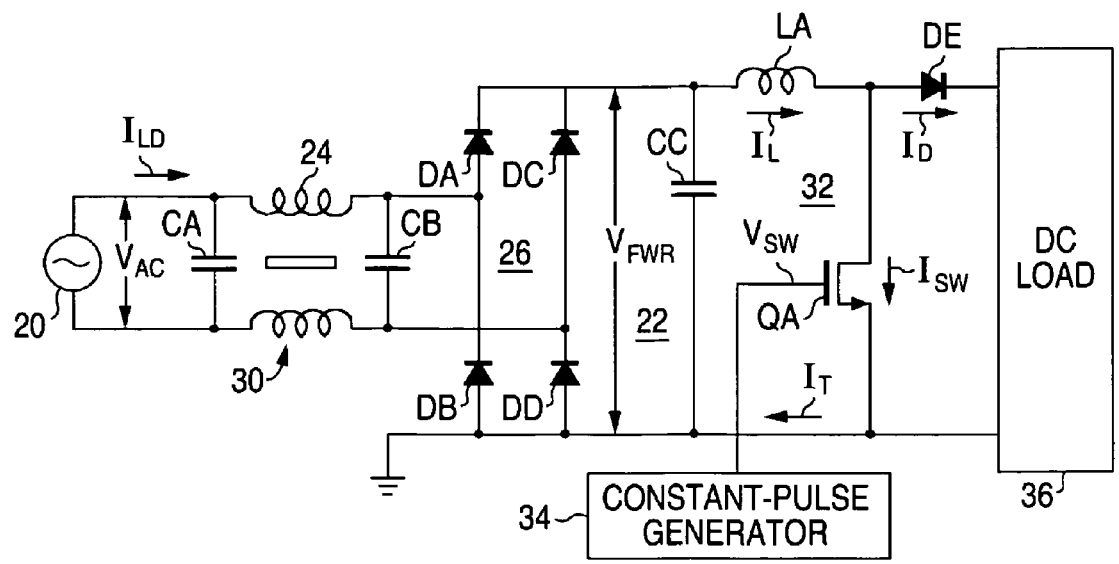
FIG. 7 is a circuit diagram of a conventional power-supply circuit with full-wave rectification and power factor correction.
Figure 8A:
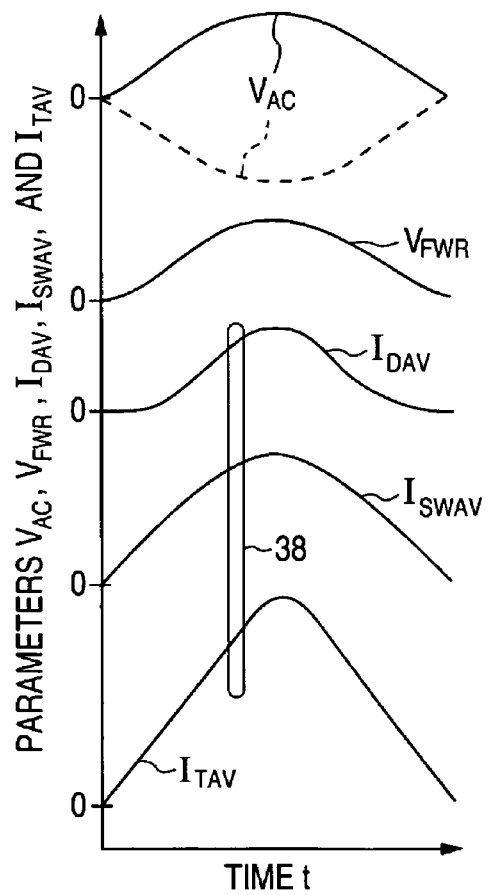
FIGS. 8a and 8b are waveform diagrams for various voltages and currents as a function of time for the power-supply circuit of FIG. 7.
Figure 8B:
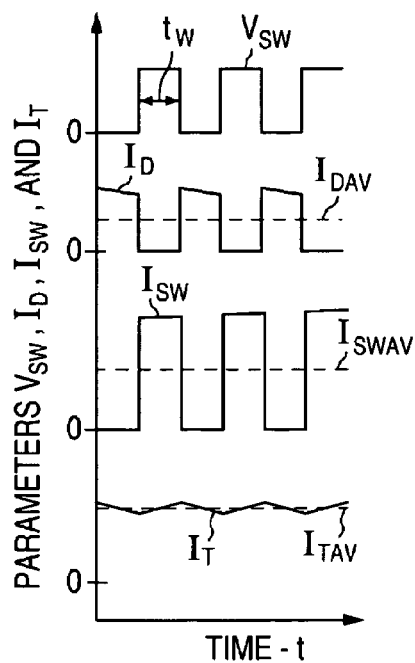

Filter and full-wave rectifier 42 consists of a low-pass filter and a full-wave rectifier. The low-pass filter performs low-pass filtering on AC supply voltage $V_{AC}$ to remove high-frequency switching spikes and RF noise. The low-pass filter is typically implemented with a common-mode transformer and a pair of capacitors configured the same as common-mode transformer 24 and capacitors CA and CB in low-pass filter 30 of FIG. 7. The full-wave rectifier performs full-wave rectification on input supply voltage $V_{AC}$ to convert it into analog full-wave rectified supply voltage signal $V_{FWR}$. The full-wave rectifier is typically implemented as a bridge rectifier formed with four pn diodes configured the same as diodes DA-DD in bridge rectifier 26 of FIG. 5 or 7. The full-wave rectifier in filter and full-wave rectifier 42 typically follows its low-pass filter but can precede the low-pass filter.

Figure 6:
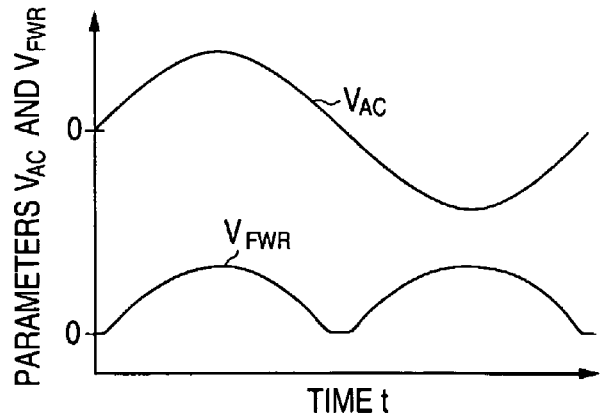
FIG. 6 is a waveform diagram for supply and rectified voltages as a function of time for the power-supply circuit of FIG. 5.

Full-wave rectified voltage $V_{FWR}$, which typically has the waveform shape generally shown in FIG. 6, is provided between a pair of local electrical lines 54 and 56 to regulator/control circuitry 44. Rectified voltage $V_{FWR}$ causes a full-wave rectified current $I_{FWR}$ to flow in local lines 54 and 56. Analogous to what is said above about input supply current $I_{AC}$ flowing through both of main lines 50 and 52, full-wave rectified current $I_{FWR}$ flows in local ground line 56 even though only local high supply line 54 is indicated as carrying rectified current $I_{FWR}$ in FIG. 9.

Regulator/control circuitry 44 is formed with a switch-mode voltage regulator 60 and control circuitry consisting of a pulse generator 62 and a pulse-width adjustor 64. Switch-mode voltage regulator 60 performs voltage regulation on full-wave rectified voltage $V_{FWR}$ to produce an analog DC regulated voltage $V_{REG}$ between a pair of output electrical lines 66 and 68. The ripple in DC regulated voltage $V_{REG}$ is typically in the vicinity of 1 V. Regulated voltage $V_{REG}$ is furnished to DC load 46 for use by load 46. In addition to regulated voltage $V_{REG}$, voltage regulator 60 provides (a) an analog sample voltage signal $V_{RS}$ indicative of full-wave rectified voltage $V_{FWR}$, (b) an analog feedback voltage signal $V_{FB}$ indicative of regulated voltage $V_{REG}$, and (c) an analog current-sense voltage signal $V_{CS}$ indicative of full-wave rectified current $I_{FWR}$.

Voltage regulator 60 operates in switch mode via a power switch 70 shown in dashed line in FIG. 9. Power switch 70 has a first current-carrying electrode E1, a second current-carrying electrode E2, and a control electrode EC for controlling current flow between current-carrying electrodes E1 and E2. First current-carrying electrode E1 is connected to a current-sense electrical conductor 72, also shown in dashed line in FIG. 9, through a current-sense node $N_{CS}$ at which current-sense voltage $V_{CS}$ is provided. Current-sense conductor 72 carries total ground current $I_T$ which constitutes, or largely constitutes, full-wave rectified current $I_{FWR}$, e.g., as flowing through local ground line 56. Current-sense voltage $V_{CS}$ is representative of total ground current $I_T$ and is thereby representative of rectified current $I_{FWR}$.

A primary control signal formed by switch voltage signal $V_{SW}$ is provided to power switch 70 at control electrode CE. Switch voltage $V_{SW}$ is carried on a primary control electrical switch electrical conductor 74 shown in dashed line within voltage regulator 60 in FIG. 9.

As in Acatrinei's power factor correction circuitry of FIG. 6, switch voltage $V_{SW}$ in power factor correction circuit 42/44 consists of a sequence of pulses at fixed pulse frequency $f_P$ much greater than fundamental supply frequency $f_{AC}$. Pulse frequency $f_P$ is usually 100 to 10,000 times supply frequency $f_{AC}$. For example, pulse frequency $f_P$ is typically 100 KHz when supply frequency $f_{AC}$ is 60 Hz. Inasmuch as each $V_{FWR}$ wave corresponds to half a $V_{AC}$ wave, approximately 833 $V_{SW}$ pulses occur during each $V_{FWR}$ wave. Power switch 70 thereby alternately turns on and off many times during each $V_{FWR}$ wave. Switch current $I_{SW}$ flows through switch 70 in response to each $V_{SW}$ pulse and drops rapidly to zero at the end of each pulse. Different from Acatrinei's power factor correction circuitry, pulse widths $t_W$ of the $V_{SW}$ pulses in power factor correction circuit 42/44 are tailored in accordance with the invention to remove overtones of fundamental frequency $f_{AC}$ from total ground current $I_T$, and thus from full-wave rectified current $I_{FWR}$, so that rectified current $I_{FWR}$ substantially tracks full-wave rectified voltage $V_{FWR}$ in time-varying waveform.

Pulse generator 62 generates switch voltage $V_{SW}$ in response to (a) sample voltage $V_{RS}$ supplied from voltage regulator 60 on a sample electrical conductor 76, (b) feedback voltage $V_{FB}$ supplied from regulator 60 on a feedback electrical conductor 78, (c) current-sense voltage $V_{CS}$, and (d) a pulse-width adjustment control voltage signal $V_{ADJ}$ supplied on an adjustment control electrical conductor 80. Pulse generator 62 also generates a group of further control signals $S_{CTL}$ which measure the time from the start of each $V_{FWR}$ wave so as to identify the present position in each $V_{FWR}$ wave.

The switch-mode nature of voltage regulator 60 causes phase angle φ between full-wave rectified current $I_{FWR}$ and full-wave rectified voltage $V_{FWR}$ to be substantially zero. Accordingly, rectified current $I_{FWR}$ is given here largely as:

$$I_{FWR} = I_0|\sin(\omega_{AC}t)| + \sum_{m=1}^{M} I_m\sin[(m+1)\omega_{AC}t] \tag{10}$$

where $I_0$ is now a positive current amplitude component for the fundamental frequency constituent $I_{FWR0}$ given as:

$$I_{FWR0}=I_0|\sin(\omega_{AC}t)| \tag{11}$$

and where $I_m$ is now a positive current amplitude component for the mth overtone frequency constituent $I_{FWRm}$ given as:

$$I_{FWRm}=I_m|\sin[(m+1)\omega_{AC}t]| \tag{12}$$

with overtone number m again being a positive integer. Inasmuch as angular supply frequency $\omega_{AC}$ equals $2\pi f_{AC}$, each overtone frequency constituent $I_{FWRm}$ in rectified current $I_{FWR}$ is the product of amplitude component $I_m$ and sinusoidal function sin $[(m+1)\omega_{AC}t]$ that varies with time t at an integer multiple of fundamental supply frequency $f_{AC}$.

Pulse-width adjustor 64 measures at least one overtone in full-wave rectified current $I_{FWR}$ in response to its voltage representative, current-sense voltage $V_{CS}$. In particular, adjustor 64 determines the magnitude of at least one overtone amplitude component $I_m$ in rectified current $I_{FWR}$ by appropriately processing current-sense voltage $V_{CS}$. Adjustor 64 normally determines the magnitudes of multiple overtone amplitude components $I_m$, preferably all overtone amplitude components $I_m$ of non-negligible value compared to fundamental amplitude component $I_0$, in a preferred implementation of power factor correction circuit 42/44.

Responsive to control signals $S_{CTL}$ which identify the present position in each $V_{FWR}$ wave, pulse-width adjustor 64 produces an adjustment factor for each measured overtone constituent $I_{FWRm}$ in full-wave rectified current $I_{FWR}$ at any measurement time t largely as the product of that overtone's measured amplitude component $I_m$ and approximately sinusoidal function sin $[(m+1)\omega_{AC}t]$ at that measurement time t. The approximate value of sinusoidal function sin $[(m+1)\omega_{AC}t]$ at each measurement time t is, as described below, typically provided from a suitable memory. Each adjustment factor is identified by reference symbol $S_{ADJ}$ in connection with FIG. 16 below. Adjustor 64 then generates pulse-width adjustment control voltage signal $V_{ADJ}$ so as to vary with the adjustment factor of each overtone frequency current constituent $I_{FWRm}$ measured by the processing of current-sense voltage $V_{CS}$. Adjustment control signal $V_{ADJ}$ varies with the sum of multiple ones of the adjustment factors when multiple overtone amplitude components $I_m$, preferably all non-negligible ones, are measured in rectified current $I_{FWR}$.

Upon being provided to pulse generator 62, adjustment control signal $V_{ADJ}$ causes generator 62 to vary pulse widths $t_W$ of switching voltage $V_{SW}$ so as to largely remove each measured overtone constituent $I_{FWRm}$ from full-wave rectified current $I_{FWR}$. In the preferred implementation where all non-negligible overtone amplitude components $I_m$ are measured so that all non-negligible overtone constituents $I_{FWRm}$ are removed, substantially only fundamental frequency constituent $I_{FWR0}$ remains in rectified current $I_{FWR}$. As a result, all non-negligible overtone constituents $I_{LDm}$ are removed from load current $I_{LD}$ so that it consists substantially only of fundamental frequency constituent $I_{LD0}$.

Referring to Eq. 8 for overtone power factor $PF_{Overtone}$, each $P_{AVm}$ overtone power term is negligible compared to the $P_{AV0}$ fundamental power term in the preferred implementation of power factor correction circuit 42/44 where all non-negligible overtone constituents $I_{FWRm}$ are removed from rectified current $I_{FWR}$ so that all non-negligible overtone constituents $I_{LDm}$ are removed from load current $I_{LD}$. Consequently, overtone power factor $PF_{Overtone}$ is very close to one in the preferred implementation.

Additionally, phase-shifted power factor $PF_{Phase}$ given by Eq. 3 is very close to one due to the switch-mode nature of voltage regulator 60. The net result is that both power factors $PF_{Overtone}$ and $PF_{Phase}$ are very close to one in the preferred implementation of power factor correction circuit 42/44 so that it achieves nearly maximum power utilization.

Pulse generator 62 and pulse-width adjustor 64 in power factor correction circuit 42/44 can be implemented with digital or analog circuitry. Digital embodiments of components 62 and 64 are described below in connection with FIGS. 15 and 16.

Figure 10:
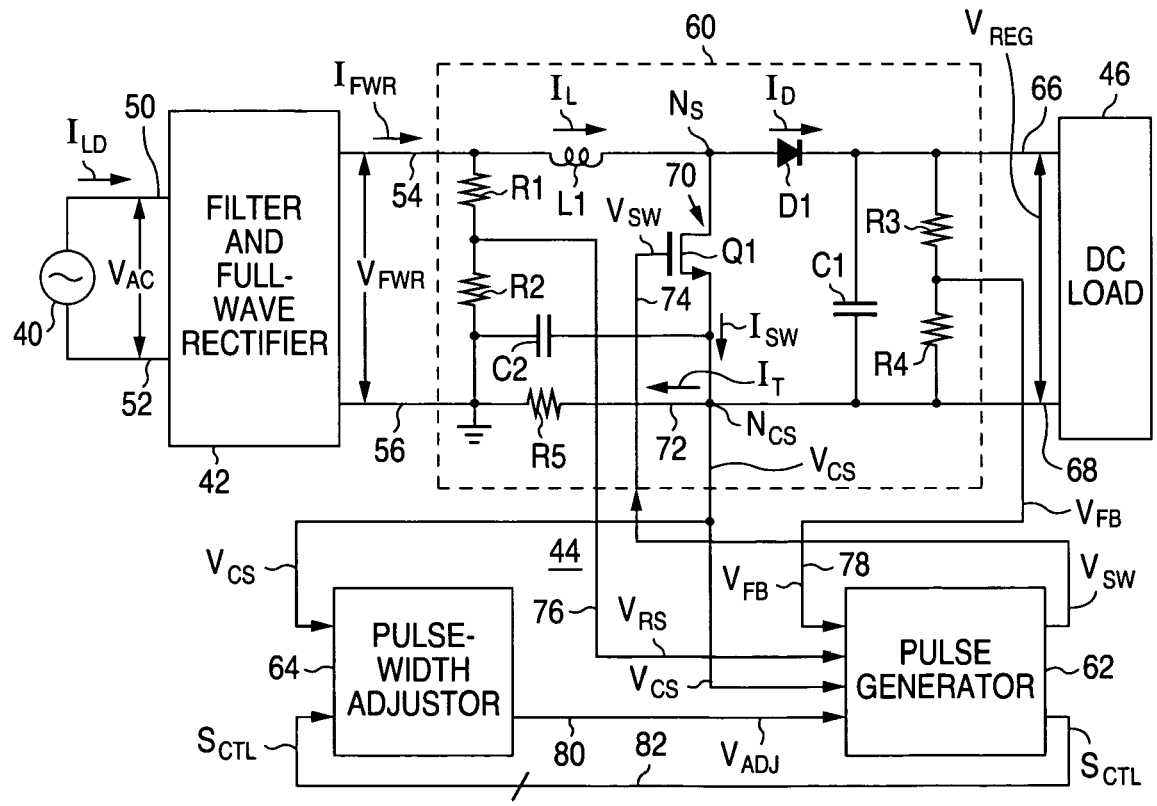
FIG. 10 is a block/circuit diagram for a boost regulator implementation of the power-supply circuit of FIG. 9.

Moving to FIG. 10, it illustrates an embodiment of power factor correction circuit 42/44 in which switch-mode voltage regulator 60 is implemented as a boost regulator. Voltage regulator 60 in FIG. 10 consists of (a) an input voltage divider formed with resistors R1 and R2, (b) an inductor L1 that carries inductor current $I_L$, (c) a power switching n-channel insulated-gate field-effect transistor Q1 that implements power switch 70 in FIG. 9, (d) a pn diode D1 that carries diode current $I_D$, (e) an output regulating capacitor C1, (f) an output voltage divider formed with resistors R3 and R4, (g) a current-sense resistor R5 that carries total ground current $I_T$, and (h) a filter capacitor C2. Output capacitor C1 has a very high capacitance, typically several thousand µF. Filter capacitor C2 filters out high-frequency switching noise at pulse frequency $f_P$.

Input voltage divider R1/R2 is connected between local lines 54 and 56. Sample voltage $V_{RS}$ is supplied from the juncture point of resistors R1 and R2 as a substantially fixed fraction of full-wave rectified voltage $V_{FWR}$. Inductor L1 is connected between local high supply line 54 and a supply node $N_S$. The drain and source of power switching transistor Q1 are respectively connected to supply node $N_S$ and current-sense node $N_{CS}$ at which current-sense voltage $V_{CS}$ is provided. The gate electrode of transistor Q1 is connected to switch conductor 74 for receiving switching voltage $V_{SW}$. The Q1 source, drain, and gate electrode respectively implement electrodes E1, E2, and EC of power switch 70 in FIG. 9.

Diode D1 is anode-to-cathode connected between supply node $N_S$ and output high supply line 66. Output capacitor C1 and output voltage divider R3/R4 are connected in common between output lines 66 and 68. Feedback voltage $V_{FB}$ is supplied from the juncture point of resistors R3 and R4 as a substantially fixed fraction of regulated voltage $V_{REG}$. The currents flowing through voltage dividers R1/R2 and R3/R4 are negligible compared to the overall average values of the one-pulse averages $I_{LAV}$, $I_{DAV}$, $I_{SWAV}$, and $I_{TAV}$ of respective currents $I_L$, $I_D$, $I_{SW}$, and $I_T$. With local ground line 56 connected to local ground, current-sense resistor R5 is connected between local ground line 56 and current-sense conductor 72 which is connected to output ground line 68 via current-sense node $N_{CS}$.

Voltage regulator 60 in power factor correction circuit 42/44 of FIG. 10 operates in the following way. Power transistor Q1 turns on in response to each pulse of switch voltage $V_{SW}$ and turns off when that $V_{SW}$ pulse ends. The change $\Delta I_L$ in current $I_L$ through inductor L1 is approximately given by Eq. 9 where $V_L$ is now the voltage across inductor L1, and $L_L$ is the inductance of inductor L1. Inductor current $I_L$ is again the sum of switch current $I_{SW}$ and diode current $I_D$ with current $I_D$ now flowing through diode D1. Total ground current $I_T$ likewise substantially equals inductor current $I_L$ which substantially equal full-wave rectified current $I_{FWR}$.

Figure 11A:
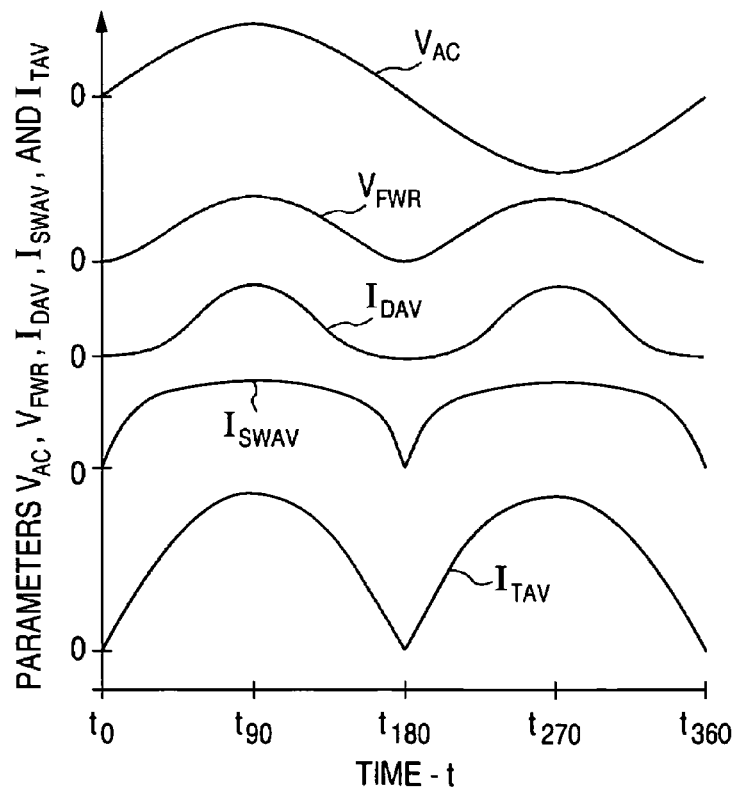
FIGS. 11a and 11b are exemplary waveform diagrams for various voltages and currents as a function of time for the power-supply circuit of FIG. 9 as implemented with the boost regulator of FIG. 10.
Figure 11B:
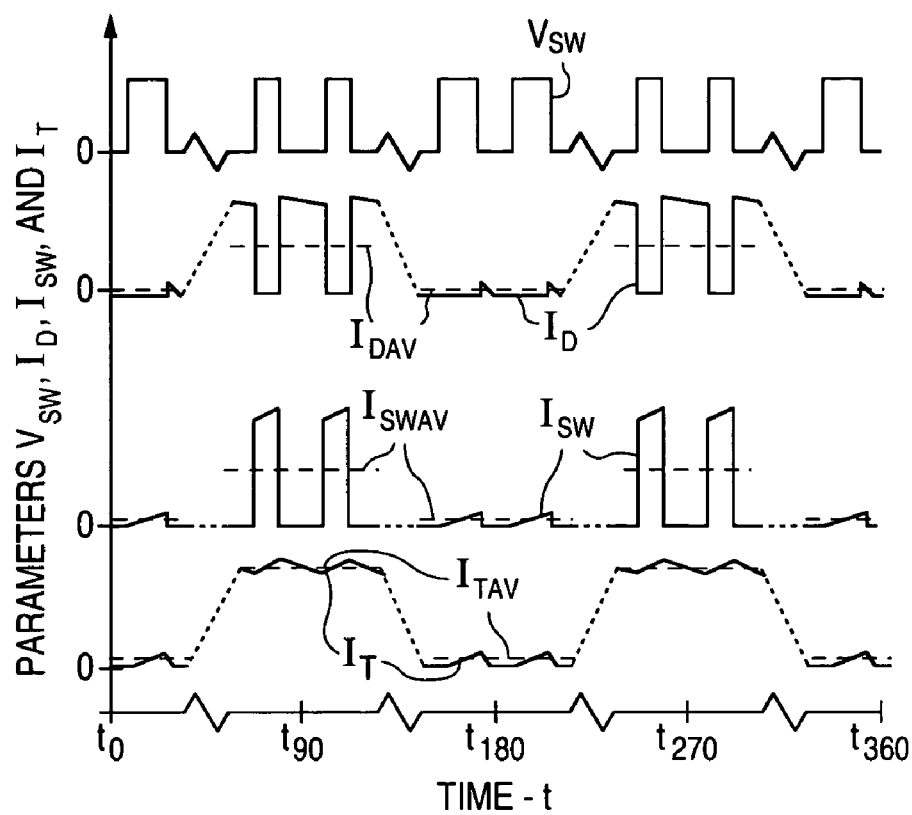

An understanding of how currents $I_D$, $I_{SW}$, and $I_D$ vary during circuit operation is facilitated with the assistance of the exemplary waveform diagrams of FIGS. 11*a* and 11*b*. FIG. 11*a* illustrates how voltages $V_{AC}$ and $V_{FWR}$ and the single-pulse averages $I_{DAV}$, $I_{SWAV}$, and $I_{DAV}$ of respective currents $I_D$, $I_{SW}$, and $I_D$ typically vary with time t for a complete $V_{AC}$ cycle, i.e., two $V_{FWR}$ cycles. Times $t_0$, $t_{90}$, $t_{180}$, $t_{270}$, and $t_{360}$ in FIG. 11*a* respectively indicate the beginning of, one-fourth way through, half way through, three-fourths way through, and the end of the $V_{AC}$ cycle. FIG. 11*b* depicts how switch voltage $V_{SW}$ and instantaneous currents $I_D$, $I_{SW}$, and $I_D$ vary with time t in the immediate vicinities of times $t_0$, $t_{90}$, $t_{180}$, $t_{270}$, and $t_{360}$.

Total ground current $I_T$, which substantially equals full-wave rectified current $I_{FWR}$ flowing through secondary high supply line 54, flows through current-sense resistor R5 at a magnitude dependent on full-wave rectified voltage $V_{FWR}$. When power transistor Q1 is turned on, i.e., switch 70 is closed, as the result of a $V_{SW}$ pulse, switch current $I_{SW}$ flows through transistor Q1. Current $I_L$ then flows at an increasing magnitude through inductor L1, causing energy to be accumulated in its magnetic field. Current $I_D$ through diode D1 is substantially zero. Capacitor C1 partially discharges to reduce regulated voltage $V_{REG}$ slightly. Total ground current $I_T$ increases as inductor current $I_L$ and switch current $I_{SW}$ increase.

When transistor Q1 turns off at the end of a $V_{SW}$ pulse, switch current $I_{SW}$ drops substantially to zero. Inductor current $I_L$ flows at a decreasing magnitude, causing energy to be released from its magnetic field. Diode current $I_D$ builds up and charges output capacitor C1 to increase regulated voltage $V_{REG}$. In particular, energy is transferred from inductor L1 to capacitor C1.

As shown in FIG. 11*a*, average currents $I_{DAV}$, $I_{SWAV}$, and $I_{TAV}$ are all high when full-wave rectified voltage $V_{FWR}$ is high during a $V_{AC}$ cycle, and are low when rectified voltage $V_{FWR}$ is low. The average value of regulated voltage $V_{REG}$ is typically in the vicinity of 300 V during a $V_{AC}$ cycle. Because the capacitance of output capacitor C1 is very high, the ripple in regulated voltage $V_{REG}$ is small, again typically in the vicinity of 1 V, during a $V_{AC}$ cycle for many implementations of DC load 46.

Figure 12:
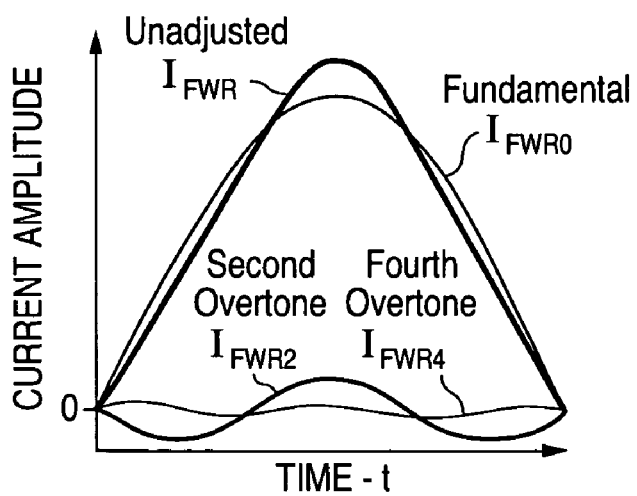
FIG. 12 is a waveform diagram, corresponding to the waveform diagrams of FIGS. 11a and 11b, for an example of the fundamental and overtone constituents that would be present in the full-wave rectified current in the power-supply circuit of FIG. 9 in the absence of the power factor correction circuitry of the invention.

FIG. 12 presents an example, corresponding to the example of FIGS. 11*a* and 11*b*, of how full-wave rectified current $I_{FWR}$, as substantially represented by total ground current $I_T$, would appear during a $V_{FWR}$ wave if pulse generator 62 generated switch voltage $V_{SW}$ as pulses of constant pulse width $t_W$. Importantly, FIG. 12 also shows how corresponding fundamental current constituent $I_{FWR0}$ and overtone current constituents $I_{FWRm}$ would appear if pulse width $t_W$ were constant. Second overtone current constituent $I_{FWR2}$ would be the largest overtone. Fourth overtone current constituent $I_{FWR4}$ would be the next largest overtone and would be considerably smaller than second overtone constituent $I_{FWR2}$. All other overtone current constituents $I_{FWRm}$ would be negligible compared to second and fourth overtone constituents $I_{FWR2}$ and $I_{FWR4}$. In this regard, rectified current $I_{FWR}$ would not have odd-numbered overtone current constituents $I_{FWRm}$ due to substantial symmetry of the $I_{FWR}$ waveform about the peaks of the $V_{FWR}$ waveform.

Figure 13:
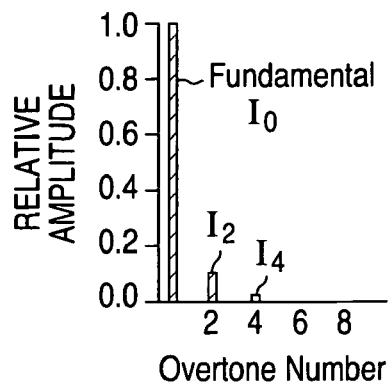
FIG. 13 is a graph, corresponding to the waveform diagrams of FIGS. 11a, 11b, and 12, for an example of the relative magnitudes of the amplitude components for the fundamental and overtone constituents that would be present in the full-wave rectified current in the power-supply circuit of FIG. 9 in the absence of the power factor correction circuitry of the invention.

Using current-sense voltage $V_{CS}$, pulse-width adjustor 64 measures the magnitudes of current amplitude components $I_m$ of those overtone constituents $I_{FWRm}$ that would appear in full-wave rectified current $I_{FWR}$ if pulse width $t_W$ of the $V_{SW}$ pulses were constant. FIG. 13 presents an example, corresponding to the example of FIGS. 11*a*, 11*b*, and 12, of this measurement. In particular, FIG. 13 illustrates the magnitudes of overtone current amplitude components $I_m$ relative to fundamental current amplitude component $I_0$. As FIG. 13 shows, second overtone amplitude component $I_2$ would be the largest of overtone amplitude components $I_m$. Fourth overtone amplitude component $I_4$ would be the next largest and would be considerably smaller than second overtone amplitude component $I_2$. All other overtone amplitude components $I_m$, including each odd-numbered one, would be negligible compared to second and fourth amplitude components $I_2$ and $I_4$.

Returning to the exemplary waveforms of FIG. 12, full-wave rectified current $I_{FWR}$ ideally should have the sinusoidal shape of fundamental current constituent $I_{FWR0}$. As FIG. 12 indicates, rectified current $I_{FWR}$ is less than fundamental constituent $I_{FWR0}$ near the beginning and ends of the $V_{FWR}$ wave and is greater than fundamental constituent $I_{FWR0}$ in the middle of the $V_{FWR}$ wave. Since rectified current $I_{FWR}$ substantially equals the sum of switch current $I_{SW}$ and diode current $I_D$, rectified current $I_{FWR}$ can be made to match fundamental constituent $I_{FWR0}$, and thereby substantially eliminate all overtone constituents $I_{FWRm}$, by suitably increasing switch current $I_{SW}$ near the beginning and ends of the $V_{FWR}$ wave and suitably decreasing switch current $I_{SW}$ in the middle of the $V_{FWR}$ wave. This is accomplished by appropriately increasing pulse width $t_W$ of the $V_{SW}$ pulses near the beginning and ends of the $V_{FWR}$ wave and suitably decreasing pulse width $t_W$ in the middle of the $V_{FWR}$ wave.

The example of FIGS. 12 and 13 applies, as mentioned above, to the situation in which pulse width $t_W$ of switch voltage $V_{SW}$ is constant. In actuality, pulse width $t_W$ is continuously adjusted for causing full-wave rectified current $I_{FWR}$ to closely approach fundamental current constituent $I_{FWR0}$. Consequently, the difference between rectified current $I_{FWR}$ and fundamental constituent $I_{FWR0}$ at any time in power factor correction circuit 42/44 of FIG. 9 or 10 is not as great as that indicated in FIG. 12. For the same reason, the magnitude of each overtone current amplitude component I, e.g., second and fourth amplitude components $I_2$ and $I_4$, relative to the magnitude of fundamental current amplitude component $I_0$ at any time in power factor correction circuit 42/44 of FIG. 9 or 10 is less than that indicated in FIG. 13. Nonetheless, power factor correction circuit 42/44 of FIG. 9 or 10 normally operates as described above to bring each otherwise non-negligible overtone constituent $I_{FWRm}$ in full-wave rectified current $I_{FWR}$ down to a negligible point, thereby causing each otherwise non-negligible overtone constituent $(I_{LL})_m$ in load current $I_{LD}$ to become negligible.

Figure 14:
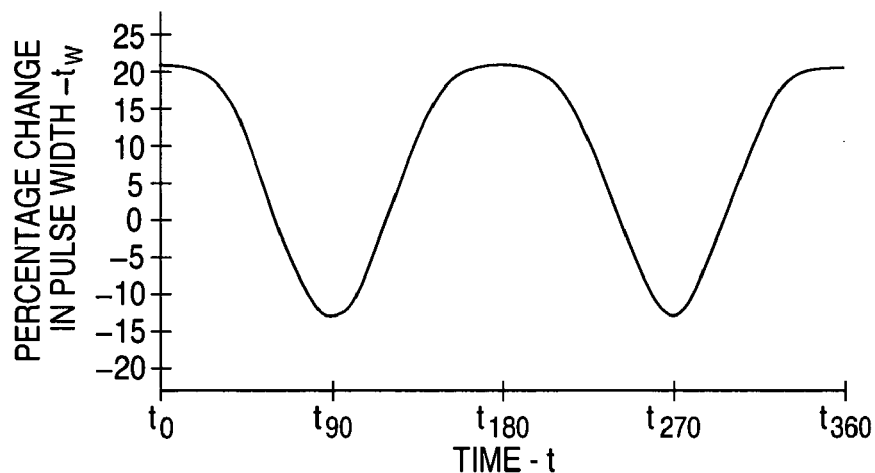
FIG. 14 is a waveform diagram, corresponding to the waveform diagrams of FIGS. 11a, 11b, and 12 and the graph of FIG. 13, for percentage change in pulse width as a function of time for the power-supply circuit of FIG. 9 as implemented with the boost regulator of FIG. 10.

FIG. 14 presents an example, corresponding to the example of FIGS. 11*a*, 11*b*, 12, and 13, of how pulse width $t_W$ is adjusted during two $V_{FWR}$ waves (one $V_{AC}$ wave as in FIG. 11*a*) in accordance with the invention for causing full-wave rectified current $I_{FWR}$ to substantially match fundamental current constituent $I_{FWR0}$ and substantially eliminate all overtone current constituents $I_{FWRm}$. In this example, pulse width $t_W$ is increased to a maximum value about 22% over a nominal $t_W$ value at times $t_0$, $t_{180}$, and $t_{360}$ at the beginnings and ends of the two $V_{FWR}$ waves and is decreased to a minimum value about 13% below the $t_W$ nominal value at times $t_{90}$ and $t_{270}$ in the middles of the $V_{FWR}$ waves.

Figure 15:
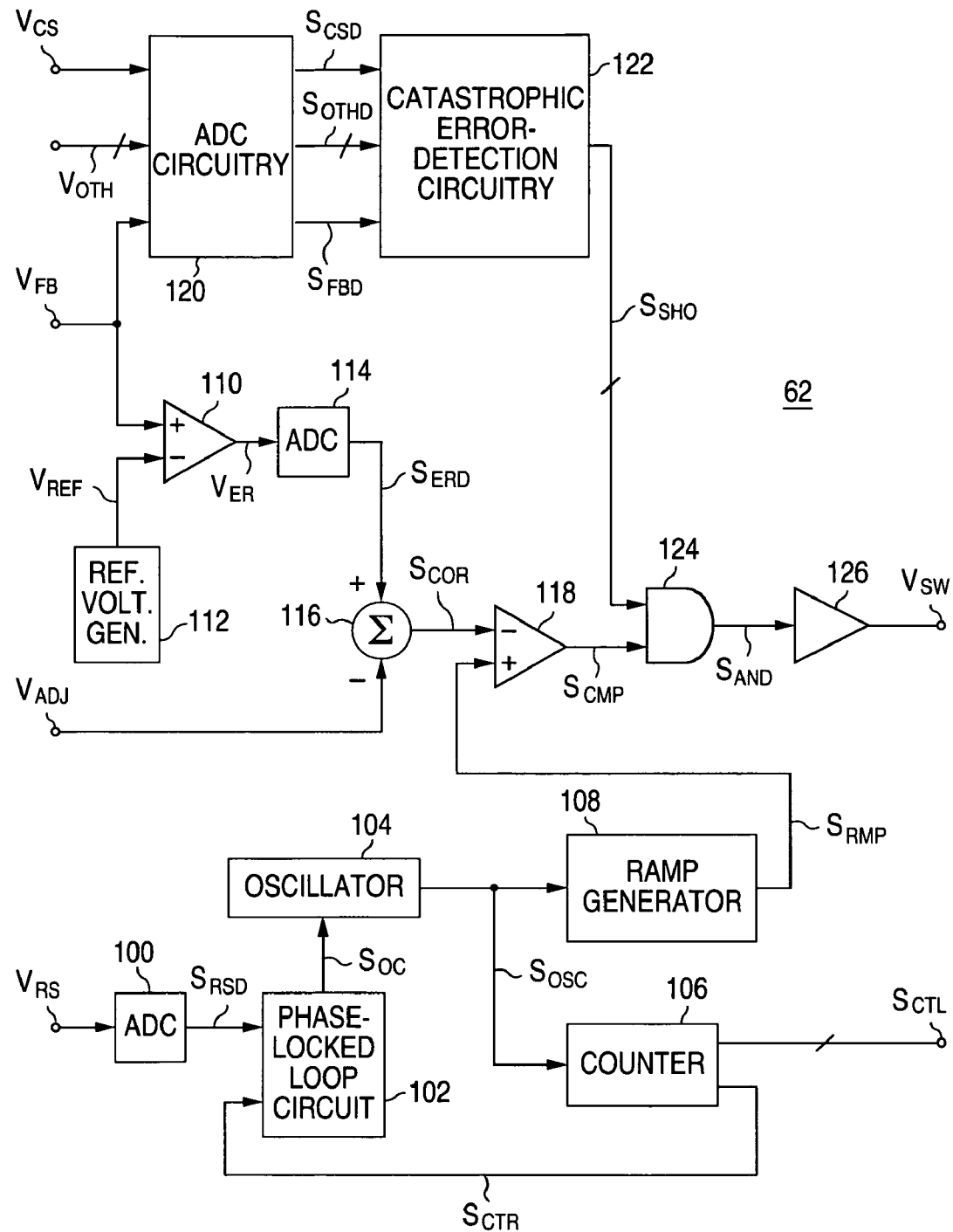
FIG. 15 is a block/circuit diagram for an implementation of the pulse generator in the power-supply circuit of FIG. 9 or 10.

FIG. 15 depicts a digital embodiment of pulse generator 62 suitable for use in power factor correction circuit 42/44 of FIG. 9 or 10. In this embodiment, generator 62 consists of an analog-to-digital converter ("ADC") 100, a phase-locked loop ("PLL") circuit 102, an oscillator 104, a counter 106, a ramp generator 108, a comparator 110, a reference voltage generator 112, an ADC 114, a summer (or adder) 116, a comparator 118, optional ADC circuitry 120, optional catastrophic error-detection circuitry 122, an AND gate 124 (needed only when ADC circuitry 120 and catastrophic error-detection circuitry 122 are present), and an output amplifier 126.

ADC 100 digitizes analog sample voltage $V_{RS}$ to produce a digital sample signal $S_{RSD}$. In response to digital sample signal $S_{RSD}$ and a counter signal $S_{CTR}$, PLL circuit 102 provides oscillator 104 with an oscillator control signal $S_{OC}$ that controls the oscillation frequency of oscillator 104. The oscillation frequency is pulse frequency $f_P$. In response to an oscillator signal $S_{OSC}$ provided from oscillator 104 at frequency $f_P$, counter 106 counts the number of oscillator pulses to produce control signals $S_{CTL}$ which identify the present position in each $V_{FWR}$ wave. Counter 106 also generates counter signal $S_{CTR}$ for PLL circuit 102. Counter signal $S_{CTR}$ regulates the clocking in such a way that a constant number of counts occurs in each $V_{FWR}$ wave. Ramp generator 108 also uses oscillator signal $S_{OSC}$ to generate a digital voltage ramp in the form of a ramp voltage signal $S_{RMP}$.

Comparator 110 compares analog feedback voltage $V_{FB}$ to a reference voltage $V_{REF}$ provided by reference voltage generator 112 to produce an analog error voltage signal $V_{ER}$ indicative of how much regulated voltage $V_{REG}$ differs from a target value of voltage $V_{REG}$. ADC 114 digitizes error voltage $V_{ER}$ to produce a digital error signal $S_{ERD}$. With pulse-width adjustment control voltage $V_{ADJ}$ being a digital signal provide from a digital embodiment of pulse-width adjustor 64 such as that described below in connection with FIG. 16, summer 116 subtracts pulse-width adjustment signal $V_{ADJ}$ from digital error signal $S_{ERD}$ to produce a correction signal $S_{COR}$. Comparator 118 compares ramp signal $S_{RMP}$ and correction signal $S_{COR}$ to generate a comparison signal $S_{CMP}$.

ADC circuitry 120 digitizes current-sense voltage $V_{CS}$ and feedback voltage $V_{FB}$ to respectively produce a digital current-sense signal $S_{CSD}$ and a digital feedback signal $S_{FBD}$. In addition, ADC circuitry 120 receives one or more analog catastrophic-condition signals $V_{OTH}$ which indicate various catastrophic conditions such as excessive temperature. ADC circuitry 120 digitizes each catastrophic-condition signal $V_{OTH}$ to produce a digital catastrophic-condition signal $S_{OTHD}$. Catastrophic error-detection circuit 122 generates one or more shutoff signals $S_{SHO}$ in response to digital current-sense signal $S_{CSD}$, digital feedback signal $S_{FBD}$, and each digital catastrophic-condition signal $S_{OTHD}$. AND gate 124 logically ANDs comparison signal $S_{CMP}$ and each shutoff signal $S_{SHO}$ to produce an AND signal $S_{AND}$. Amplifier 126 amplifies AND signal $S_{AND}$ to generate switch voltage $V_{SW}$ at a high value sufficient to close power switch 70 in FIG. 9, or to turn on power switching transistor Q1 in FIG. 10, when signals $S_{CMP}$ and $S_{SM}$ are all at high logical values. If not, switch voltage $V_{SW}$ is generated at a low value sufficient to cause switch 70 to open or power transistor Q1 to turn off.

If power factor correction circuit 42/44 is in a catastrophic condition because, for instance, too much current is flowing through current-sense resistor R5 as indicated by current-sense voltage $V_{CS}$ or if the circuit temperature is too high as indicated by a catastrophic-condition signal $V_{OTH}$, catastrophic error-detection circuit 122 provides a corresponding shutoff signal $S_{SHO}$ at a low logical value. The resulting low value of switch voltage $V_{SW}$ opens switch 70 or turns off power transistor Q1. This disables power factor correction circuit 42/44 until the catastrophic condition is alleviated. In the event that error-detection circuit 122 is absent, comparison signal $S_{CMP}$ is provided directly to amplifier 126 for producing switch voltage $V_{SW}$.

Feedback voltage $V_{FB}$ exceeds reference voltage $V_{REF}$ when regulated voltage $V_{REG}$ exceeds the $V_{REG}$ target value, and vice versa. If feedback voltage $V_{FB}$, as adjusted by adjustment signal $V_{ADJ}$ for forcing full-wave rectified current $I_{FWR}$ toward fundamental current constituent $I_{FWR0}$, is greater than reference voltage $V_{REF}$, the comparison made by comparator 118 between ramp signal $S_{RMP}$ and correction signal $S_{COR}$ causes comparison signal $S_{CMP}$ to be logically high for a shorter time period. The length of pulse width $t_W$ of switch voltage $V_{SW}$ is thereby decreased to force regulated voltage $V_{REG}$ downward toward its target value. The reverse occurs when feedback voltage $V_{FB}$, as adjusted by adjustment voltage $V_{ADJ}$, is less than reference voltage $V_{REF}$. The length of pulse width $t_W$ increases to force regulated voltage $V_{REG}$ upward toward its target value.

Figure 16:
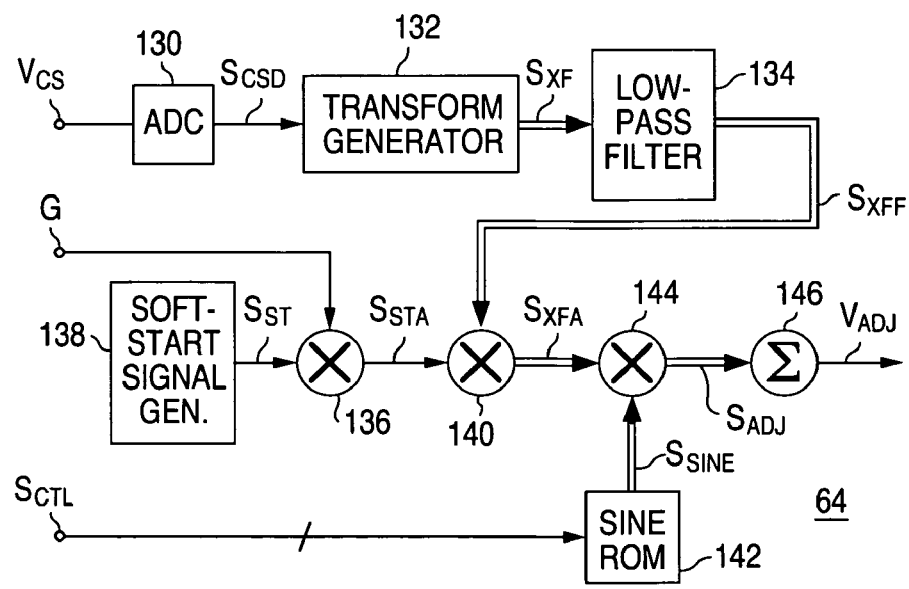
FIG. 16 is a block diagram for an implementation of the pulse-width adjustor in the power-supply circuit of FIG. 9 or 10.

FIG. 16 depicts a digital embodiment of pulse-width adjustor 64 suitable for use in power factor correction circuit 42/44 of FIG. 9 or 10. In this embodiment, adjustor 64 consists of an ADC 130, a transform generator 132, a low-pass filter 134, a multiplier 136, a soft-start signal generator 138, a multiplier 140, a sine read-only memory ("ROM") 142, a multiplier 144, and a summer 146.

ADC 130, which may be part of ADC circuitry 120 in digital embodiment of pulse generator 62 in FIG. 16, digitizes current-sense voltage $V_{CS}$ to produce digital current-sense voltage signal $S_{CSD}$. Transform generator 132 measures the overtones in full-wave rectified current $I_{FWR}$ by performing a transform operation on digital current-sense signal $S_{CSD}$ to convert it into the frequency domain. The result of the transform operation is a group of transform signals $S_{XF}$ at values corresponding to the magnitudes of overtone amplitude components $I_m$ of selected ones $I_{FWRmSel}$ of overtone frequency constituents $I_{FWRm}$. Selected overtone frequency constituents $I_{FWRmSel}$ preferably consist of those overtone frequency constituents $I_{FWRm}$, including frequency constituents $I_{FWR2}$ and $I_{FWR4}$, most likely to be non-negligible. Transform generator 132 is typically a Fourier transform generator. Generator 132 preferably operates according to a fast Fourier algorithm. Low-pass filter 134 digitally attenuates high-frequency components in transform signals $S_{XF}$ to produce respectively corresponding filtered transform signals $S_{XFF}$.

Multiplier 136 multiplies a soft-start digital signal $S_{ST}$ provided from soft-start signal generator 138 by a gain input factor G to produce an amplified soft-start digital signal $S_{STA}$ at a gain $G_A$. Multiplier 140 then multiplies filtered transform signals $S_{XFF}$ respectively by gain $G_A$ to produce respectively corresponding amplified transform signals $S_{XFA}$. Responsive to control signals $S_{CTL}$ that identify the position in each $V_{FWR}$ wave at any measurement time, sine ROM 142 provides a group of normalized sine amplitude signals $S_{SINE}$ at magnitudes respectively corresponding to the magnitudes of selected overtone frequency constituents $I_{FWRmsel}$ at that measurement time. Multiplier 144 multiplies amplified transform signals $S_{XFA}$ respectively by their corresponding sine amplitude signals $S_{SINE}$ to form a group of respectively corresponding adjustment factors $S_{ADJ}$. Summer 146 sums adjustment factors $S_{ADJ}$ to produce pulse-width adjustment control voltage $V_{ADJ}$.

The embodiment of pulse generator 62 in FIG. 15 can be converted to an analog device largely be deleting ADCs 100 and 114 and ADC circuitry 120. The embodiment of pulse-width adjustor 64 in FIG. 16 can be converted to an analog device largely by similarly deleting ADC 130. If adjustor 64 is a digital device while generator 62 is an analog device, generator 62 or adjustor 64 is provided with a digital-to-analog converter for converting the digital version of pulse-width adjustment control voltage $V_{ADJ}$ into an analog signal for use by generator 62. For an analog implementation of adjustor 64, transform generator 132 is typically implemented with a set of switched capacitors for transforming current-sense signal $V_{CS}$ into transform signals $S_{XF}$ in the frequency domain.

Figure 17:
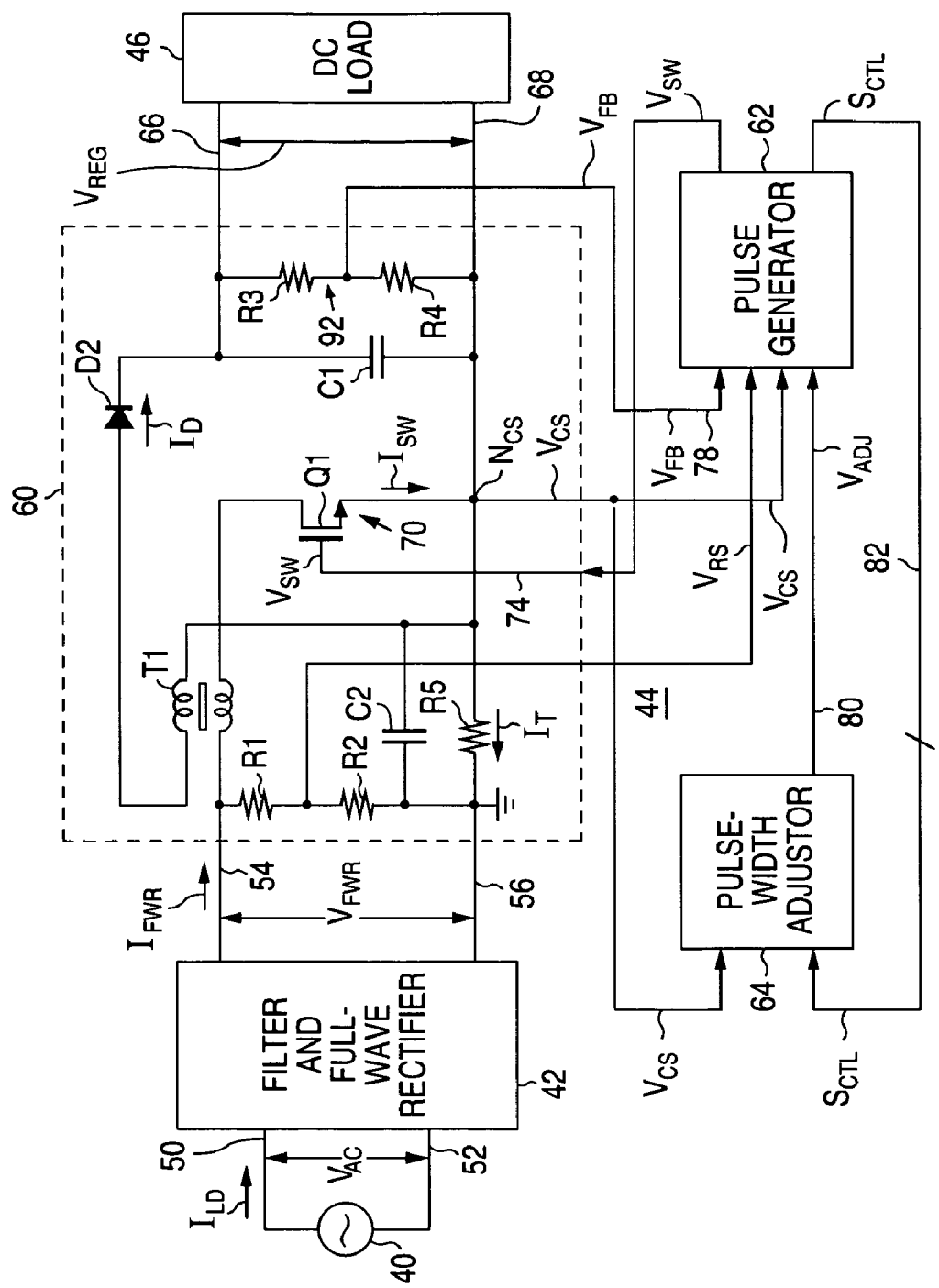
FIG. 17 is a block/circuit diagram for a flyback regulator implementation of the power-supply circuit of FIG. 9.

FIG. 17 illustrates an embodiment of power factor correction circuit 42/44 of FIG. 9 in which switch-mode voltage regulator 60 is implemented as a flyback regulator. Voltage regulator 60 in FIG. 17 contains input voltage divider R1/R2, power switching transistor Q1, output regulating capacitor C1, output voltage divider R3/R4, current-sense resistor R5, and filter capacitor C2. Instead of inductor L1 and diode D1, regulator 60 in FIG. 17 has a transformer T1 and a pn diode D2. One coil of transformer T1 is connected between local high supply line 54 and the drain of transistor Q1. The other coil of transformer T1 is connected between current-sense node $N_{CS}$ and the anode of diode D2 whose cathode is connected to output high supply line 66.

The operation of the flyback implementation of FIG. 17 is similar to the operation of the boost implementation of FIG. 10 as illustrated by the waveforms of FIGS. 11*a* and 11*b*. There is a significant difference in that the diode current $I_D$ through diode D2 does not flow through current-sense resistor R5.

Total ground current $I_T$, which substantially equals switch current $I_{SW}$ through power switching transistor Q1 and through local high supply line 54 and the primary winding of transformer T1 in the flyback implementation of FIG. 17, increases at a magnitude dependent on full-wave rectified voltage $V_{FWR}$. When power transistor Q1 is turned on, i.e., switch 70 is closed, as the result of a $V_{SW}$ pulse, switch current $I_{SW}$ flows through transistor Q1. Energy thereby accumulates in the magnetic field of transformer T1. Current $I_D$ through diode D2 is substantially zero. Capacitor C1 partially discharges to reduce regulated voltage $V_{REG}$ slightly. Total ground current $I_T$ falls to zero when power transistor Q1 is turned off.

When transistor Q1 turns off at the end of a $V_{SW}$ pulse, switch current $I_{SW}$ drops substantially to zero as does the current in the primary winding of transformer T1 and current $I_T$ through current-sense resistor R5. The secondary winding of transformer T1 becomes active causing diode current $I_D$ to increase. Diode D2 becomes conductive, causing energy stored in the magnetic field of transformer T1 to be transferred to capacitor C1 via diode current $I_D$. Also, diode current $I_D$ flows back into the secondary winding of transformer T1 without flowing in current-sense resistor R5.

Overtones in full-wave rectified current $I_{FWR}$ in the flyback implementation of FIG. 17 are measured and removed in the manner described above. In particular, rectified current $I_{FWR}$ can be made to match fundamental current constituent $I_{FWR0}$, and substantially eliminate all overtone constituents $I_{FWRm}$, by suitably adjusting pulse width $t_W$ of the $V_{SW}$ pulses during each $V_{FWR}$ wave.

While the invention has been described with reference to preferred embodiments, this description is solely for the purpose of illustration. For example, the present technique of measuring and removing overtones could be applied directly to load current $I_{LD}$, i.e., prior to full-wave rectification. Voltage regulator 60 can alternatively be implemented as a buck regulator or as a buck-boost regulator. Suitable buck and buck-boost regulators are described in Erickson et al., *Fundamentals of Power Electronics* (2d ed., Springer Science+Business Media), 2001, the contents of which are incorporated by reference.

The invention could be described in harmonic terminology instead of overtone terminology. The mth overtone of a fundamental frequency is the (m+1)th harmonic. The fundamental frequency is then the first harmonic. Various modifications and applications may thus be made by those skilled in the art without departing from the true scope of the invention as described in the appended claims.

I claim:

1. A circuit responsive to an input power supply signal having an input supply voltage at a fundamental supply frequency and having an input supply current, the circuit comprising regulator/control circuitry for measuring at least one overtone of the fundamental supply frequency in the input supply current or in a rectified form of the input supply current, and for operating on the input supply current or on the rectified form to suppress the at least one measured overtone by adjusting a primary control signal in accordance with the measurement of the at least one overtone.

2. The circuit of claim 1, wherein:
each measured overtone in the input supply current or in the rectified form is expressible as a product of an amplitude component and a sinusoidal function that varies with time at an integer multiple of the fundamental supply frequency; and
the regulator/control circuitry measures each measured overtone in the input supply current or in the rectified form by determining that overtone's amplitude component.

3. The circuit of claim 2, wherein the regulator/control circuitry generates an adjustment factor for each measured overtone in the input supply current or in the rectified form based on the product of that overtone's amplitude component and sinusoidal function.

4. The circuit of claim 3, wherein the regulator/control circuitry adjusts the input supply current or the rectified form by an amount corresponding to the adjustment factor for each measured overtone.

5. A circuit responsive to an input power supply signal having an input supply voltage at a fundamental supply frequency, the circuit comprising:
rectifier circuitry for performing full-wave rectification on the input power supply signal to produce a full-wave rectified supply signal at a full-wave rectified voltage and a full-wave rectified current;
a regulator for regulating the full-wave rectified voltage to produce a regulated power supply voltage with reduced voltage ripple as compared to the full-wave rectified voltage; and
control circuitry for measuring at least one overtone of the fundamental supply frequency in the full-wave rectified current and for providing the regulator with a primary control signal that causes the at least one measured overtone to be suppressed from the full-wave rectified current such that the full-wave rectified current corresponds to the full-wave rectified voltage in time-varying waveform, the primary control signal having been adjusted in accordance with the measurement of the at least one overtone.

6. The circuit of claim 5, wherein the regulator comprises:
a switch having first and second current-carrying electrodes and a control electrode for receiving the primary control signal to control current flow between the current-carrying electrodes; and
a current-sense conductor through which at least a portion of the full-wave rectified current flows and which is coupled to the first current-carrying electrode through a current-sense node that provides a current-sense signal indicative of the full-wave rectified current.

7. The circuit of claim 6, wherein the control circuitry comprises:
a pulse generator for generating the primary control signal as a sequence of pulses of controlled pulse widths for enabling current to flow through the current-carrying electrodes in response to each pulse and for restricting current from flowing through the current-carrying electrodes in response to termination of each pulse; and
a pulse-width adjustor responsive to the current-sense signal for measuring the at least one overtone in the full-wave rectified current and for providing the pulse generator with an adjustment control signal that causes the pulse widths of the pulses of the primary control signal to be adjusted so as to suppress the at least one overtone from the full-wave rectified current.

8. The circuit of claim 7, wherein the pulse generator generates the pulses of the primary control signal at a fixed pulse frequency.

9. The circuit of claim 7, wherein:
each measured overtone in the full-wave rectified voltage is expressible as a product of an amplitude component and a sinusoidal function that varies with time at an integer multiple of the fundamental supply frequency; and
the pulse-width adjustor measures each measured overtone in the full-wave rectified current by determining that overtone's amplitude component as present in the current-sense signal.

10. The circuit of claim 9, wherein the pulse-width adjustor determines an adjustment factor for an overtone in the full-wave rectified current based on a product of that overtone's amplitude component and the sinusoidal function.

11. The circuit of claim 10, wherein the pulse-width adjustor generates the adjustment control signal so as to vary with the adjustment factor of each overtone measured in the current-sense signal, whereby the adjustment control signal varies with a sum of multiple adjustment factors when multiple overtones are measured in the current-sense signal.

12. The circuit of claim 7, wherein the pulse-width adjustor comprises a transform generator for measuring each measured overtone in the full-wave rectified current by transforming the current-sense signal, or a further signal which corresponds to the current-sense signal in time-varying waveform, into a frequency domain to determine that overtone's amplitude component.

13. The circuit of claim 12, wherein the transform generator comprises a Fourier transform generator.

14. The circuit of claim 13, wherein the Fourier transform generator operates according to a fast Fourier transform algorithm.

15. The circuit of claim 12, wherein the pulse-width adjustor determines an adjustment factor for an overtone in the full-wave rectified current based on a product of that overtone's amplitude component and a sinusoidal function.

16. The circuit of claim 15, wherein the pulse-width adjustor generates the adjustment control signal so as to vary with the adjustment factor of each overtone measured in the current-sense signal, whereby the adjustment control signal varies with a sum of multiple adjustment factors when multiple overtones are measured in the current-sense signal.

17. A method of performing power factor correction on an input power supply signal having an input supply voltage at a fundamental supply frequency, the method comprising:

performing full-wave rectification on the input power supply signal to produce a full-wave rectified signal having a full-wave rectified voltage and a full-wave rectified current;

regulating the full-wave rectified signal to produce a regulated power supply signal with reduced voltage ripple as compared to the full-wave rectified signal;

measuring at least one overtone of the fundamental supply frequency in the full-wave rectified current; and providing a primary control signal that causes the at least one measured overtone to be suppressed from the full-wave rectified current such that the full-wave rectified current corresponds to the full-wave rectified voltage in time-varying waveform, the primary control signal having been adjusted in accordance with the measurement of the at least one overtone.

18. The method of claim 17, wherein the full-wave rectified signal is regulated in buck-boost mode.

19. The circuit of claim 1, wherein the regulator/control circuitry operates in a buck-boost mode.

20. The circuit of claim 5, wherein the regulator operates in buck-boost mode.

* * * * *